(12) United States Patent
Imhoff et al.

(10) Patent No.: US 12,240,629 B2
(45) Date of Patent: Mar. 4, 2025

(54) DEVICE FOR OPTIMAL SATELLITE EFFECTS DELIVERY VIA REVERSE TIME HEAT ISOMORPHISM

(71) Applicant: Raytheon Company, Arlington, VA (US)

(72) Inventors: Scott Allen Imhoff, Centennial, CO (US); Brianne R. Hoppes, Westminster, CO (US); Marcus A. Teter, Belgrade, MT (US); Kendy Hall, Aurora, CO (US)

(73) Assignee: Raytheon Company, Arlington, VA (US)

( * ) Notice: Subject to any disclaimer, the term of this patent is extended or adjusted under 35 U.S.C. 154(b) by 402 days.

(21) Appl. No.: 17/749,945

(22) Filed: May 20, 2022

(65) Prior Publication Data

US 2023/0373658 A1      Nov. 23, 2023

(51) Int. Cl.
*B64G 1/10*        (2006.01)
*G06F 17/13*     (2006.01)

(52) U.S. Cl.
CPC ......... *B64G 1/1007* (2013.01); *B64G 1/1085* (2013.01); *G06F 17/13* (2013.01)

(58) Field of Classification Search
None
See application file for complete search history.

(56) References Cited

U.S. PATENT DOCUMENTS 11,227,691 B2    1/2022  Neumann
11,228,942 B2    1/2022  Guo et al.
(Continued)

FOREIGN PATENT DOCUMENTS

CN         107482638 B      4/2020
RU         2272757 C2  *   3/2006
WO    WO-2023012375 A1 *   2/2023       ............. G06F 17/13

OTHER PUBLICATIONS

P. Analytic Properties of Heat Equation Solutions and Reachable Sets, by Alexander Strohmaier and Alden Waters, arXiv: 2006.05762v1 [math.AP], 2020 (Year: 2020).*
(Continued)

*Primary Examiner* — Peter D Nolan
*Assistant Examiner* — Michael F Whalen
(74) *Attorney, Agent, or Firm* — Schwegman Lundberg & Woessner, P.A.

(57) ABSTRACT

Apparatus, computer-readable medium, and method for optimal delivery of one or more satellite effects via reverse time heat equation isomorphism including constructing a generalized formulation of the heat equation corresponding to a commander's intent for delivery of the one or more satellite effects, performing a separation of variables to decouple a plurality of variables into a plurality of corresponding separated equations, solving the plurality of separated equations to produce candidate solutions, applying boundary conditions to each candidate solution, filtering the candidate solutions to mitigate ill-posedness of solving the inverse of the heat equation, assessing formal differences between the candidate solutions and the inverse of the heat equation, and generating an optimized schedule of the one or more satellite effects based on the assessment of the formal differences of the candidate solutions.

20 Claims, 5 Drawing Sheets

(56) References Cited

U.S. PATENT DOCUMENTS

| | | |
|---|---|---|
| 11,232,348 B2 | 1/2022 | Lie et al. |
| 11,237,797 B2 | 2/2022 | Blatz et al. |
| 11,238,087 B2 | 2/2022 | Ma et al. |
| 11,238,493 B1 | 2/2022 | Dakic et al. |
| 11,238,547 B2 | 2/2022 | Elbsat et al. |

OTHER PUBLICATIONS

Translation of RU-2272757 (Year: 2003).*

* cited by examiner

DEVICE FOR OPTIMAL SATELLITE EFFECTS DELIVERY VIA REVERSE TIME HEAT ISOMORPHISM

FEDERALLY SPONSORED RESEARCH

This invention was made with government support under Contract No. FA8807-10-C-0001 FA8807-21-C-0002. The U.S. government has certain rights in this invention.

BACKGROUND

1. Field

Embodiments described herein generally relate to satellite communications and, more particularly, to devices and methods that deliver signals to satellites to cause the satellites to change their operation or current state.

2. Discussion of Related Art

Satellites orbiting the Earth are controlled by ground stations emitting radio signals that are received by the satellites causing the satellites to perform a variety of tasks. Ground stations may be located either on the surface of the Earth or in its atmosphere. Satellites may be geostationary or non-geostationary. In addition to those orbiting the Earth, satellites also orbit other celestial bodies and travel through deep space. Control of a satellite may also be provided by a signal relayed from another satellite or may originate from another space-based device.

Satellite constellations are used as a network to provide coordinated ground coverage. The plurality of networked satellites in a constellation may operate together under shared control and be synchronized so that their communication coverage may overlap to complement each other.

SUMMARY

According to at least one embodiment is a communications apparatus for optimal delivery of one or more satellite effects via reverse time heat equation isomorphism comprising one or more processors configured to perform a plurality of steps including constructing a generalized formulation of the heat equation including a plurality of variables, the generalized heat equation corresponding to a commander's intent for delivery of the one or more satellite effects, performing a separation of variables to decouple the plurality of variables into a plurality of corresponding separated equations, solving the plurality of separated equations to produce candidate solutions, applying boundary conditions to each candidate solution to verify the candidate solution satisfies the boundary conditions, filtering the candidate solutions to mitigate ill-posedness of solving the inverse of the heat equation, assessing formal differences between the candidate solutions and the inverse of the heat equation to find an optimal solution corresponding to the solution of the inverse of the generalized heat equation, and generating an optimized schedule of the one or more satellite effects based on the assessment of the formal differences of the candidate solutions.

In one example, the one or more processors are further configured to determine that each step of the plurality of steps is isomorphic to running a generalized heat equation backwards in time.

In another example, the communications apparatus further comprises assessing formal differences between the plurality of corresponding separated equations and the inverse of the heat equation by determining a first number of functions N of a single variable in a product decomposition of the inverse heat equation, determining a second number of functions M of a single variable in a product decomposition of the plurality of variables, and determining the quantity of N-M. Assessing formal differences between the plurality of corresponding separated equations and the inverse of the heat equation may include determining the quantity of N-M is non-zero, and responsive to determining the quantity of N-M is non-zero, implementing a change of variables, an orthogonalization technique, or a representation change by the Kolmogorov-Arnold Representation Theorem.

In one example, assessing formal differences between the candidate solutions and the inverse of the heat equation comprises determining the plurality of solved equations includes component terms that are relations, functionals, or distributions. Assessing formal differences between the candidate solutions and the inverse of the heat equation may further comprise responsive to determining that the plurality of solved equations includes component terms that are relations, functionals, or distributions, implementing a smoothing algorithm, a machine learning algorithm, or an artificial intelligence algorithm to solve the plurality of separated equations. Assessing formal differences between the candidate solutions and the inverse of the heat equation may further comprise obtaining a solution of said component terms using iterative optimization, a reservoir computer, a machine learning algorithm, an artificial intelligence algorithm, or a combination thereof to perform an ArgMin operation or an ArgMax operation to solve the plurality of separated equations.

In another example, solving the plurality of separated equations comprises applying an ArgMin operation or ArgMax operation to the plurality of separated equations by analysis, machine learning, or artificial intelligence. Applying boundary conditions to each candidate solution may comprise applying the boundary conditions as the range over which the ArgMin operation or the ArgMax operation is applied.

In one example, assessing formal differences between the candidate solutions and the inverse of the heat equation comprises determining a figure of merit of the boundary conditions, and comparing the figure of merit to a predetermined figure of merit. The predetermined figure of merit may include a timeliness T at time t=0. The predetermined figure of merit may include a number of space vehicles participating in a positioning effect being below a predetermined number of space vehicles.

In another example, assessing formal differences between the candidate solutions and the inverse of the heat equation comprises comparing an elimination of outlier solutions that are unstable among the solution for each equation of the plurality of solved equations to a smoothing operation applied to a solution of the inverse heat equation. An unstable outlier solution may have a high derivative.

In one example, the plurality of variables includes one or more operational variables and/or one or more architectural variables. The one or more operational variables may include a concurrency. The one or more architectural variables may include a total number of the one or more satellites, a number of ground antennas, one or more satellite orbits, or a data rate of one or more satellite antennas.

In another example, the one or more operational variables include one or more of a number of contacts per ground antenna, a number of space vehicles delivering the one or more satellite effects, a concurrency as the amount of overlap in time between uploading the one or more satellite effects and the delivery of the one or more satellite effects to a user.

In one example, generating the optimized schedule comprises generating the schedule in a format that is implemented by one or more satellites to fulfil the commander's intent.

According to at least one embodiment is a method of operating a communications apparatus for optimal delivery of one or more satellite effects via reverse time heat equation isomorphism, the method including a plurality of steps comprising constructing a generalized formulation of the heat equation including a plurality of variables, the generalized heat equation corresponding to a commander's intent for delivery of the one or more satellite effects, performing a separation of variables to decouple the plurality of variables into a plurality of corresponding separated equations, solving the plurality of separated equations to produce candidate solutions, applying boundary conditions to each candidate solution to verify the candidate solution satisfies the boundary conditions, filtering the candidate solutions to mitigate ill-posedness of solving the inverse of the heat equation, assessing formal differences between the candidate solutions and the inverse of the heat equation to find an optimal solution corresponding to the solution of the inverse of the generalized heat equation, and generating an optimized schedule of the one or more satellite effects based on the assessment of the formal differences of the candidate solutions.

In one example, the method comprises determining that each step of the plurality of steps is isomorphic to running a generalized heat equation backwards in time.

In another example, the method further comprises assessing formal differences between the plurality of corresponding separated equations and the inverse of the heat equation by determining a first number of functions N of a single variable in a product decomposition of the inverse heat equation, determining a second number of functions M of a single variable in a product decomposition of the plurality of variables, and determining the quantity of N-M. Assessing formal differences between the plurality of corresponding separated equations and the inverse of the heat equation may further comprise determining the quantity of N-M is non-zero, and responsive to determining the quantity of N-M is non-zero, implementing a change of variables, an orthogonalization technique, or a representation change by the Kolmogorov-Arnold Representation Theorem.

In one example, assessing formal differences between the candidate solutions and the inverse of the heat equation comprises determining the plurality of solved equations includes component terms that are relations, functionals, or distributions. Assessing formal differences between the candidate solutions and the inverse of the heat equation may further comprise responsive to determining that the plurality of solved equations includes component terms that are relations, functionals, or distributions, implementing a smoothing algorithm, a machine learning algorithm, or an artificial intelligence algorithm to solve the plurality of separated equations. Assessing formal differences between the candidate solutions and the inverse of the heat equation may further comprise obtaining a solution of said component terms using iterative optimization, a reservoir computer, a machine learning algorithm, an artificial intelligence algorithm, or a combination thereof to perform an ArgMin operation or an ArgMax operation to solve the plurality of separated equations.

In another example, solving the plurality of separated equations comprises applying an ArgMin operation or ArgMax operation to the plurality of separated equations by analysis, machine learning, or artificial intelligence. Applying boundary conditions to each candidate solution may comprise applying the boundary conditions as the range over which the ArgMin operation or the ArgMax operation is applied.

In one example, assessing formal differences between the candidate solutions and the inverse of the heat equation comprises determining a figure of merit of the boundary conditions; and comparing the figure of merit to a predetermined figure of merit. The predetermined figure of merit may include a timeliness T at time t=0. The predetermined figure of merit may include a number of space vehicles participating in a positioning effect being below a predetermined number of space vehicles.

In another example, assessing formal differences between the candidate solutions and the inverse of the heat equation comprises comparing an elimination of outlier solutions that are unstable among the solution for each equation of the plurality of solved equations to a smoothing operation applied to a solution of the inverse heat equation. An unstable outlier solution may have a high derivative.

In one example, the plurality of variables includes one or more operational variables and/or one or more architectural variables. The one or more architectural variables may include a total number of the one or more satellites, a number of ground antennas, one or more satellite orbits, or a data rate of one or more satellite antennas.

In another example, generating the optimized schedule comprises generating the optimized schedule in a format that is implemented by one or more satellites to fulfil a commander's intent.

In one example, the one or more operational variables include one or more of a number of contacts per ground antenna, a number of space vehicles delivering the one or more satellite effects, a concurrency as the amount of overlap in time between uploading the one or more satellite effects and the delivery of the one or more satellite effects to a user.

According to at least one embodiment is a non-transitory computer-readable medium storing instructions, the instructions executed by one or more processors of a communications apparatus for optimal delivery of one or more satellite effects via reverse time heat equation isomorphism, the instructions causing the one or more processors to implement a plurality of steps comprising constructing a generalized formulation of the heat equation including a plurality of variables, the generalized heat equation corresponding to a commander's intent for delivery of the one or more satellite effects, performing a separation of variables to decouple the plurality of variables into a plurality of corresponding separated equations, solving the plurality of separated equations to produce candidate solutions, applying boundary conditions to each candidate solution to verify the candidate solution satisfies the boundary conditions, filtering the candidate solutions to mitigate ill-posedness of solving the inverse of the heat equation, assessing formal differences between the candidate solutions and the inverse of the heat equation to find an optimal solution corresponding to the solution of the inverse of the generalized heat equation, and generating an optimized schedule of the one or more satellite effects based on the assessment of the formal differences of the candidate solutions.

According to at least one embodiment is a communications apparatus for optimal delivery of one or more satellite effects via reverse time heat equation isomorphism comprising one or more modules configured to perform a plurality of steps including constructing a generalized formulation of the heat equation including a plurality of variables, the generalized heat equation corresponding to a commander's intent for delivery of the one or more satellite effects, performing a separation of variables to decouple the plurality of variables into a plurality of corresponding separated equations, solving the plurality of separated equations to produce candidate solutions, applying boundary conditions to each candidate solution to verify the candidate solution satisfies the boundary conditions, filtering the candidate solutions to mitigate ill-posedness of solving the inverse of the heat equation, assessing formal differences between the candidate solutions and the inverse of the heat equation to find an optimal solution corresponding to the solution of the inverse of the generalized heat equation, and generating an optimized schedule of the one or more satellite effects based on the assessment of the formal differences of the candidate solutions.

In one example, the one or more modules are further configured to determine that each step of the plurality of steps is isomorphic to running a generalized heat equation backwards in time.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
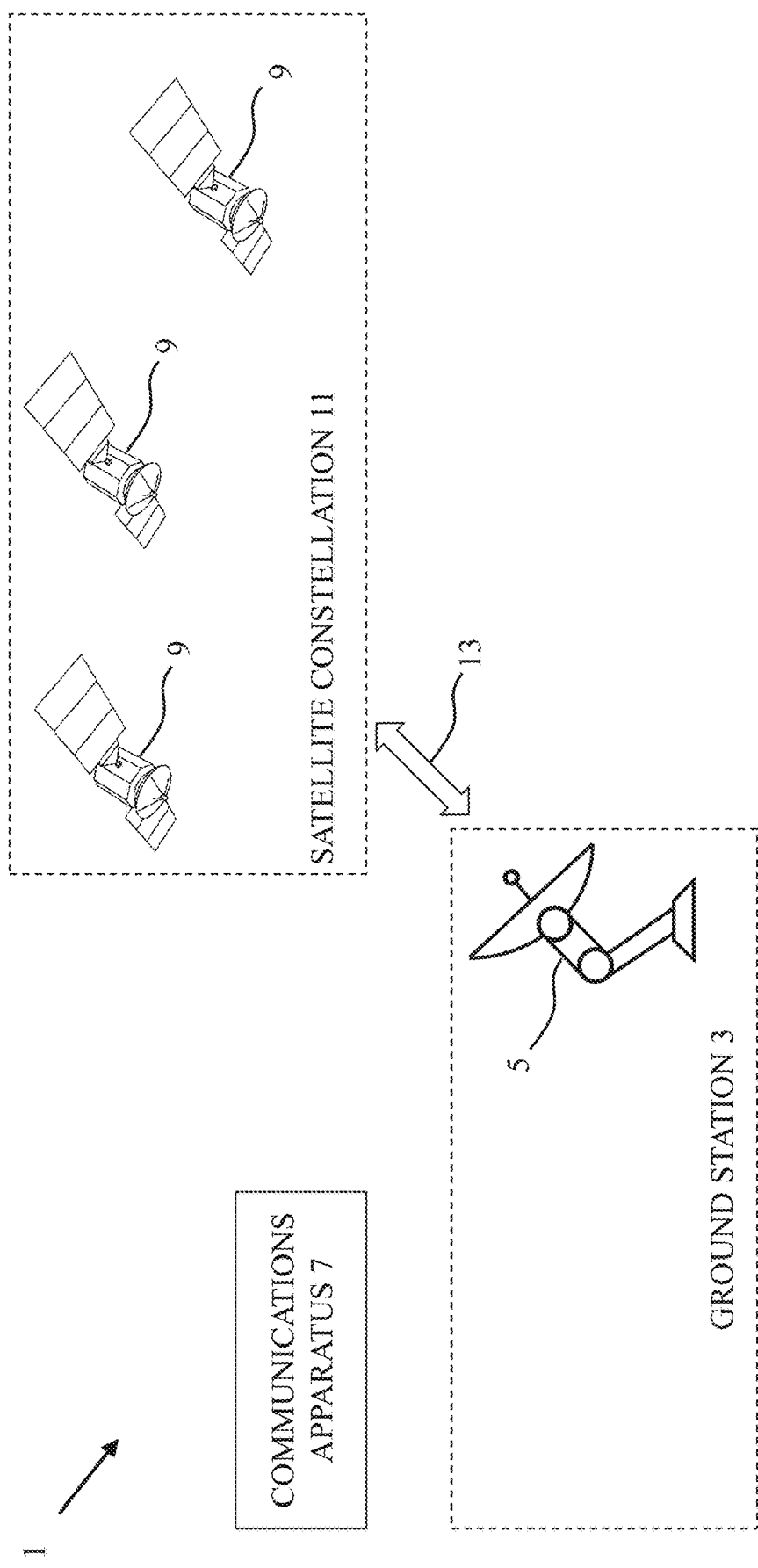
FIG. 1 illustrates a satellite communicates system according to various examples described herein.

It is becoming increasingly important to optimize the scheduling and delivery of satellite "effects" for civilian and military applications. Historically, satellites were designed to have a specific purpose such as relaying a radio frequency signal or capturing images of the surface of the Earth. More recently, with the proliferation of satellite constellations, the term "effects" has been used to describe desired behaviors of the constellation. As used herein in at least one example, the term "effects" represents the ability of one or more satellites to perform time critical behaviors when given limited lead time. Examples of satellite effects include boosting the power of a signal provided by a satellite, responding to an urgent need, providing enhanced performance modes, encrypting a special signal, and delivering specialized on-demand capabilities (e.g., "a commander's intent"). Effects are not limited to military applications, but include civilization applications including weather emergencies, drug interdiction, land use management, and water content determination in crops or other farming aspects. Examples provided herein are not limiting. The phrase "commander's intent" as used in at least one example is the end state of what a satellite or constellation needs to accomplish. Examples of a commander's intent include a particular location on the surface of the Earth being monitored at a certain time and/or for a particular duration. The context of a "commander" as used herein includes both military commander's (e.g., a Colonel) as well as a civilian or other user in charge of controlling satellites.

Satellite effects often consume resources that could stress or damage the satellite if they are deployed for long time periods, yet they can be necessary to deliver safety-of-life applications for civilians and to ensure availability during military conflict. Prior approaches to realizing better performance and timeliness/throughput for effects delivery have relied on incremental advancements, iterative techniques that require multiple stages of feedback to incrementally move the satellite towards a commander's intent (which wastes valuable time), and add-ons to legacy systems. The paradigm shift in the embodiments described herein is to take a commander's expressed intent for a set of satellite behaviors and directly solve the inverse problem that optimally fulfills that expressed intent. So, instead of inching forward the state-of-the art, the described embodiments directly solve for the commander's desire.

The inventors performed a gedankenexperiment which motivated the embodiments described herein. It started with the question "Did John Wilkes Booth shoot Abraham Lincoln or did Abraham Lincoln shoot John Wilkes Booth?" The answer depends upon which direction the arrow of time is pointing. If it is pointing forward, the bullet passes from the barrel of Booth's gun, through the air, and then into Lincoln. If it is pointing in the reverse-time direction, the bullet leaves Lincoln and jumps up into the barrel of Booth's gun. The important observation, in comparing these two directions, is that the reverse-time direction requires much better aim, to precisely glide up into Booth's barrel, while only a much coarser aim is required of Booth as he shoots Lincoln. The problem of solving for optimal commanding to achieve the commander's intent is characterized by the need for steps which reverse time, solving for events that need to take place before the start of effects delivery at T=0, and those steps achieve a type of entropy reversal, because the behavior of entropy changes with a reversal of the arrow of time (Hence the aim in the reverse direction far surpasses Booth's aim in the forward direction.). The classic reverse-time problem, which provides a framework for the commander's intent, is the reverse-time heat equation, which provides a framework upon which embodiments are based.

The mathematical setting of the commander's intent is inverse problems, in particular ill-posed problems. The classic ill-posed problem of running the heat equation backwards in time is isomorphic to many of the component problems of achieving optimal effects delivery and fulfilling a commander's intent. A classic example of running the heat equation backwards in time is in the application of image sharpening, where a blurred image is treated as a melted thing and the heat equation is run backwards in time to take out the melting. The ill-posedness shows up in the speckle of the de-blurred image.

To improve upon prior solutions to satellite effects scheduling, embodiments described herein aim to leverage isomorphism between the inverse heat equation and an optimization problem where the optimization problem is generalized to achieve a desired state (i.e., the commander's intent), an inverse problem is used instead of an iterative process, and the solution method is decoupled from a specific problem space. In general, for at least a plurality of embodiments, the process of using the heat equation paradigm to solve the commander's intent problem includes four steps: decoupling variables, solving separated equations, application of boundary conditions, and application of an ill-posed problem filter. It is appreciated that embodiments include modifications to these steps as understood by one of skill in the art.

The following is an example of running the heat equation backwards in time. To begin, the state of the problem is the heat equation subject to certain conditions. The heat equation is:

$$\frac{\partial u}{\partial t} = k \frac{\partial^2 u}{\partial x^2}$$

subject to:

$u(0,t)=u(L,t)=0$ and $u(x,0)=f(x)$, where solutions of $t<0$ correspond to reversing time.

In a first step, separation of variables is used to disassemble the heat equation into two ordinary differential equations (ODEs). Make the following substitution:

$u(x,t)=F(x)G(t)$.

Differentiating this results in:

$$\frac{\partial u}{\partial t} = F \frac{\partial G}{\partial t} \text{ and } \frac{\partial^2 u}{\partial x^2} = G \frac{\partial^2 F}{\partial x^2}$$

Plugging these back in, the heat equation becomes:

$$F \frac{\partial G}{\partial t} = kG \frac{\partial^2 F}{\partial x^2},$$

which can be separated into functions of t on the left and functions of x on the right:

$$\frac{1}{G(t)} \frac{\partial G(t)}{\partial t} = \frac{k}{F(x)} \frac{\partial^2 F(x)}{\partial x^2}$$

In a second step, set both sides equal to a constant k:

$$\frac{1}{G(t)} \frac{\partial G(t)}{\partial t} = \frac{k}{F(x)} \frac{\partial^2 F(x)}{\partial x^2} = \lambda,$$

rearrange the left equation:

$$\frac{1}{G} \frac{dG}{dt} = \lambda \rightarrow \frac{dG}{G} = \lambda dt,$$

and integrate:

$\ln G = \lambda t + \ln C_0$ $G = C_0 e^{\lambda t}$

Then, rearrange the right equation:

$$\frac{d^2 F}{dx^2} + \left(\frac{-\lambda}{k}\right) F = 0.$$

This is the harmonic oscillator, whose solution is:

$$F = C_1 \cos\left(\sqrt{\frac{-\lambda}{k}} x\right) + C_2 \sin\left(\sqrt{\frac{-\lambda}{k}} x\right).$$

In a third step, apply boundary conditions:

$$u = GF = C_0 e^{\lambda t} \left( C_1 \cos\left(\sqrt{\frac{-\lambda}{k}} x\right) + C_2 \sin\left(\sqrt{\frac{-\lambda}{k}} x\right) \right)$$

$u(0, t) = C_0 e^{\lambda t} C_1 = 0$ $$u(L, t) = C_0 e^{\lambda t} \left[ C_2 \sin\left(\sqrt{\frac{-\lambda}{k}} L\right) \right] = 0$$

$$\sqrt{\frac{-\lambda}{k}} L = \pi n$$

$$u_n = C_n e^{\lambda t} \sin\left(\frac{\pi n x}{L}\right)$$

$$u_n = C_n e^{k \frac{\pi^2 n^2}{L^2}(-t)} \sin\left(\frac{\pi n x}{L}\right).$$

where the solution is:

$$u(x, t) = \sum_{n=1}^{\infty} c_n e^{k \frac{\pi^2 n^2}{L^2}(-t)} \sin\left(\frac{\pi n x}{L}\right)$$

$t < 0$ $$u(x, 0) = f(x) = \sum_{n=1}^{\infty} C_n \sin\left(\frac{\pi n x}{L}\right).$$

The initial condition becomes the Fourier expansion.

In a fourth step, the ill-posedness is mitigated:

$$u(x, t) = \sum_{n=1}^{\infty} c_n e^{k \frac{\pi^2 n^2}{L^2}(-t)} \sin\left(\frac{\pi n x}{L}\right).$$

Putting these four steps into context, a system 1 illustrated in FIG. 1 includes a ground station 3, a transceiver 5, a communications apparatus 7, and a plurality of satellites 9 forming a satellite constellation 11 that is in communication with the ground station 3 via a communication channel 13. The communications apparatus 7 is, in some examples, included in the ground station 3. The communications apparatus 7 may be included in any other suitable device or apparatus. The ground station 3, in certain examples includes one or more transceivers, one or more transponders, one or more transmitters and/or one or more receivers for communicating with the satellite constellation 11. Communications include the transmission of signals from transmitters, transponders, or transceivers of the ground station 3 to the satellite constellation 11 located in orbit around the Earth. One example of such a signal includes a signal for carrying out a commander's intent. The communication channel 13 is, in certain examples, unidirectional, and in other examples, bidirectional. The commander's intent may be transmitted via modulated electromagnetic signals including radio waves. It is understood that other systems and embodiments using multiple ground stations to communicate with one or more satellite constellations are contemplated herein.

The communications apparatus 7 implements a candidate effects algorithm for the delivery of effects corresponding to the commander's intent, which is compared to major steps of the reverse time heat equation algorithm, and at each step is compared to the reverse heat equation to ensure that the isomorphism is preserved. Where the isomorphism fails, the candidate algorithm is probably incomplete or non-optimal. At each step formal differences between the candidate algorithm and the exemplar reverse heat algorithm are assessed to determine if they are required for intended uses. If they are not, then the algorithm iterates to achieve a closer isomorphism. This guarantees an algorithm that is optimal in a specific sense (optimal up to an isomorphism).

The commander's intent is a framework for scheduling barrages of effects, where: a commander expresses her/his desired state of effects delivery at a set of specified places and times. From that expressed commander's intent, the inverse problem is solved to determine an optimal schedule of uploads and commands to respond to the understood need. Embodiments provided herein generate algorithms that deliver the commander's intent.

Figure 2:
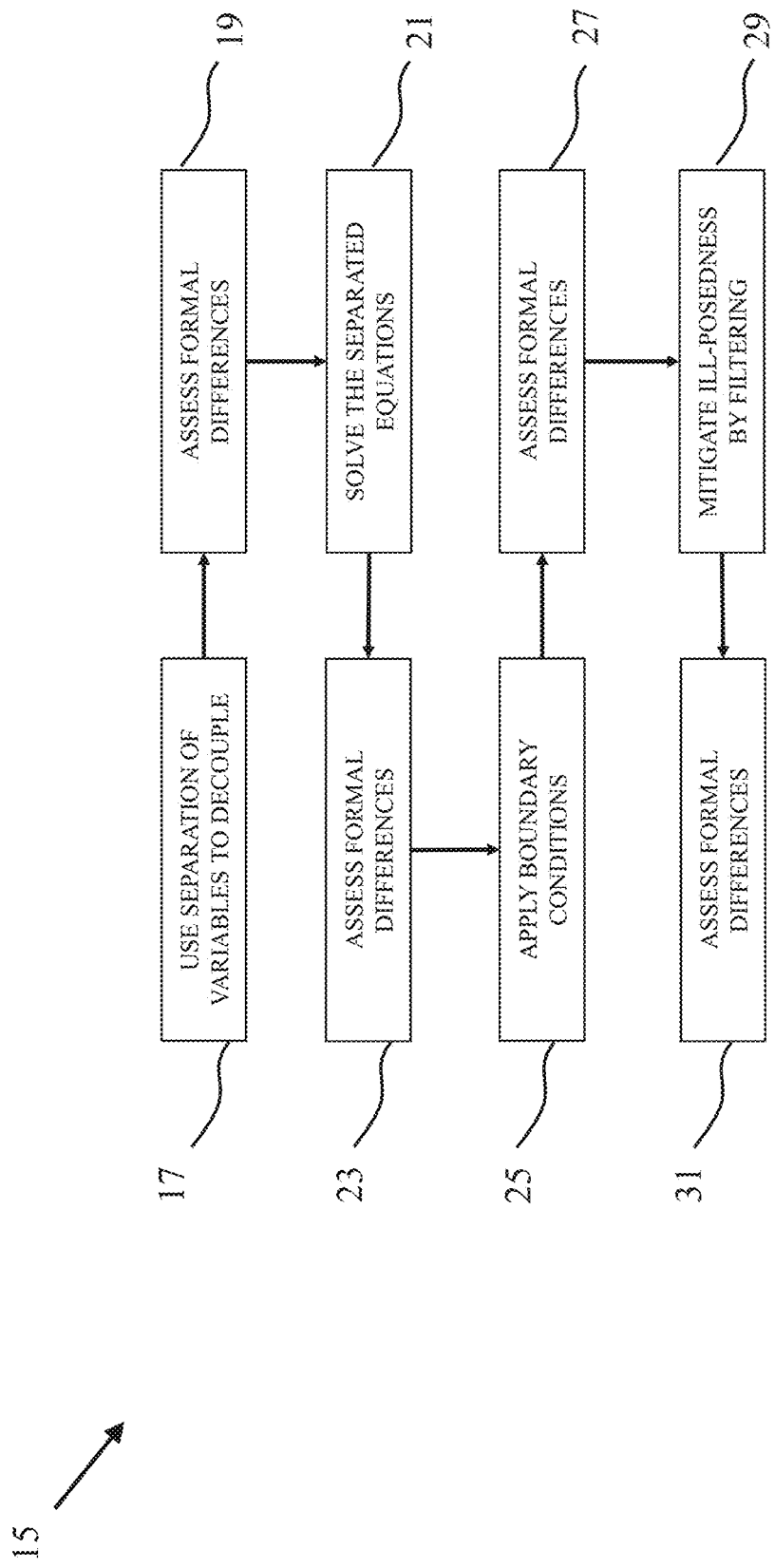
FIG. 2 is a functional block diagram of a method of operating a communications apparatus according to various examples described herein.

FIG. 2 is a functional block diagram of a method 15 of operating a communications apparatus (e.g., the communications apparatus 7). To execute the method 15, in an embodiment, a processor (e.g., a general-purpose processor from AMD or Intel) is utilized to execute program instructions to carry out the method 15. In another example, one or more modules carry out the method 15, where the structure of the one or more modules for performing the functions of the method 15 is a processor as just described. The method 15 includes four steps of processing a commander's intent and four assessment steps. The four steps of processing the commander's intent include a step 17 of decoupling variables, a step 21 of solving separated equations, a step 25 of application of boundary conditions, and a step 29 of applying an ill-posed problem filter. The phrase "ill-posedness" or the like is, in at least one example, meant to encompass a plurality of local extrema in the solution and/or a situation where there is more than one solution. An assessment of formal differences is performed after each of the four steps 17, 21, 25, 29. A first assessment step 19 occurs after the step 17, a second assessment step 23 occurs after the step 21, a third assessment step 27 occurs after the step 25, and a fourth assessment step 31 occurs after the step 29.

In at least one example of the first assessment step 19, a formal difference between the commander's intent (represented as a generalized formulation of the heat equation) at the step 17 and the inverse heat equation would be: instead of $F=F_1(var1) F_2(var2) \ldots F_3(varN)$ where all the factors are functions of a single variable (as desired), one would have $F=F_1(var1) F_2(var2) \ldots F_3(varM) \ldots Fq(varP, varQ, \ldots varS)$, which is less desirable (because of troughs rather than distinct pit extrema), where only the first M variables in the factorization are functions of a single variable. The rest of the functions in the product decomposition are functions of two or more variables. Therefore, the quantitative formal difference is the N-M number of variables that do not appear in the product decomposition as functions of a single variable. Measuring a non-zero N-M would inform the algorithm to invoke either a change of variables, an orthogonalization technique, or a representation change as by Kolmogorov's Representation Theorem, for example.

In at least one example of the second assessment step 23, a formal difference between the commander's intent at the step 21 and the inverse heat equation includes component terms $F_1(var1), F_2(var2), \ldots$ etc. that for the commander's intent are relations rather than functions or are functionals rather than functions, or are distributions rather than functions. Detection of those formal differences informs the algorithm to invoke smoothing, to use AI/ML (artificial intelligence/machine learning), use a reservoir computer (i.e., a framework for computation derived from recurrent neural network theory), or to perform other methods of solution which are outside of functional analysis but still retain isomorphisms to the inverse-heat solution. Examples of AI-ML algorithms include Decision Tree, Linear Regression, Logical Regression, and SVM (support vector machine).

In at least one example of the third assessment step 27, a formal difference between a commander's intent at the step 25 and the inverse heat equation, includes a figure of merit, such as timeliness T, that has a known value (the commander's intended value) at time=0, and that there are other boundary conditions as well such as boundary conditions for multilateration to perform geolocation, the number of space vehicles participating in a positioning effect never falling below 4, or the number of contacts never falling below 1. A 'contact' is a distinct communication link.

In at least one example of the fourth assessment step 31, a formal difference between the commander's intent at the step 29 and the inverse heat equation includes using smoothing for the heat equation inverse solution while equivalently in the commander's intent problem using the elimination of outlier solutions or solutions that are unstable (i.e., have high derivatives).

According to certain embodiments, should the assessment of formal differences at any of the steps 19, 23, 27, 31 indicate that such formal differences are not adequate for an intended application, the method 15 may be interrupted to modify the corresponding step corresponding to the commander's intent. For example, should the step 27 indicate that the application of boundary conditions provided in the step 25 is not isomorphic to the inverse-heat solution, then the boundary conditions are changed and the method 15 is repeated using the new boundary conditions in the step 25.

Upon the step 31 indicating formal differences are satisfactory, an optimized schedule of the one or more satellite effects is generated. Generating, in at least some embodiments, includes transmitting to a ground station or any other intended station and/or outputting the schedule in a useable format that is ready to be implemented by one or more satellites. In some embodiments the one or more satellites receive the optimized schedule and implement it in order to deliver the one or more satellite effects. The optimized schedule is generated in a format useable by or implemented by one or more satellites.

The communications apparatuses, methods, systems, and other embodiments described herein may compliment autonomous or other protocols implemented in satellite operation and control. For example, it is becoming more common for certain satellite behaviors to be automated and/or include operations implemented by AI or ML algorithms. By incorporating the techniques disclosed herein for quickly optimizing a schedule of satellite effects to implement a commander's intent, such autonomous protocols may improve in their efficacy and usefulness for a variety of applications.

Figure 3:
FIG. 3 is a table of examples of algorithms generated by a communications apparatus according to various examples described herein.

FIG. 3 provides a table generally indicated at 33 including two examples of algorithms shown as two columns 33c, 33s in parallel with the column 33b of the reverse-time heat equation. The four steps described above are provided in a first column 33a of the table 33. The isomorphism discussed above can be used to generate different algorithms for different kinds of effects. In the third column 33c in the table 33, the isomorphism is used to generate an algorithm for optimal timeliness of effects delivery. In the fourth column 33d in the table 33, the isomorphism is used to deliver an algorithm for optimal satellite positioning performance (navigation). Accordingly, the reverse-time approach delivers optimal algorithms for effects delivery; the outputs are these algorithms and they may be different algorithms delivering different effects. However, what these algorithms have in common is that they are the solutions to inverse problems (i.e., a desire to have this state of affairs at time T=0). From that stated commanders intent, one works backwards to solve for the architectural and operational parameters which achieve that state of affairs at time T=0. As such, what the algorithms in the examples of the third column 33c and the fourth column 33d have in common is that they are attempting to solve in a backwards in time approach from a specific state of affairs at time T=0.

Figure 4:
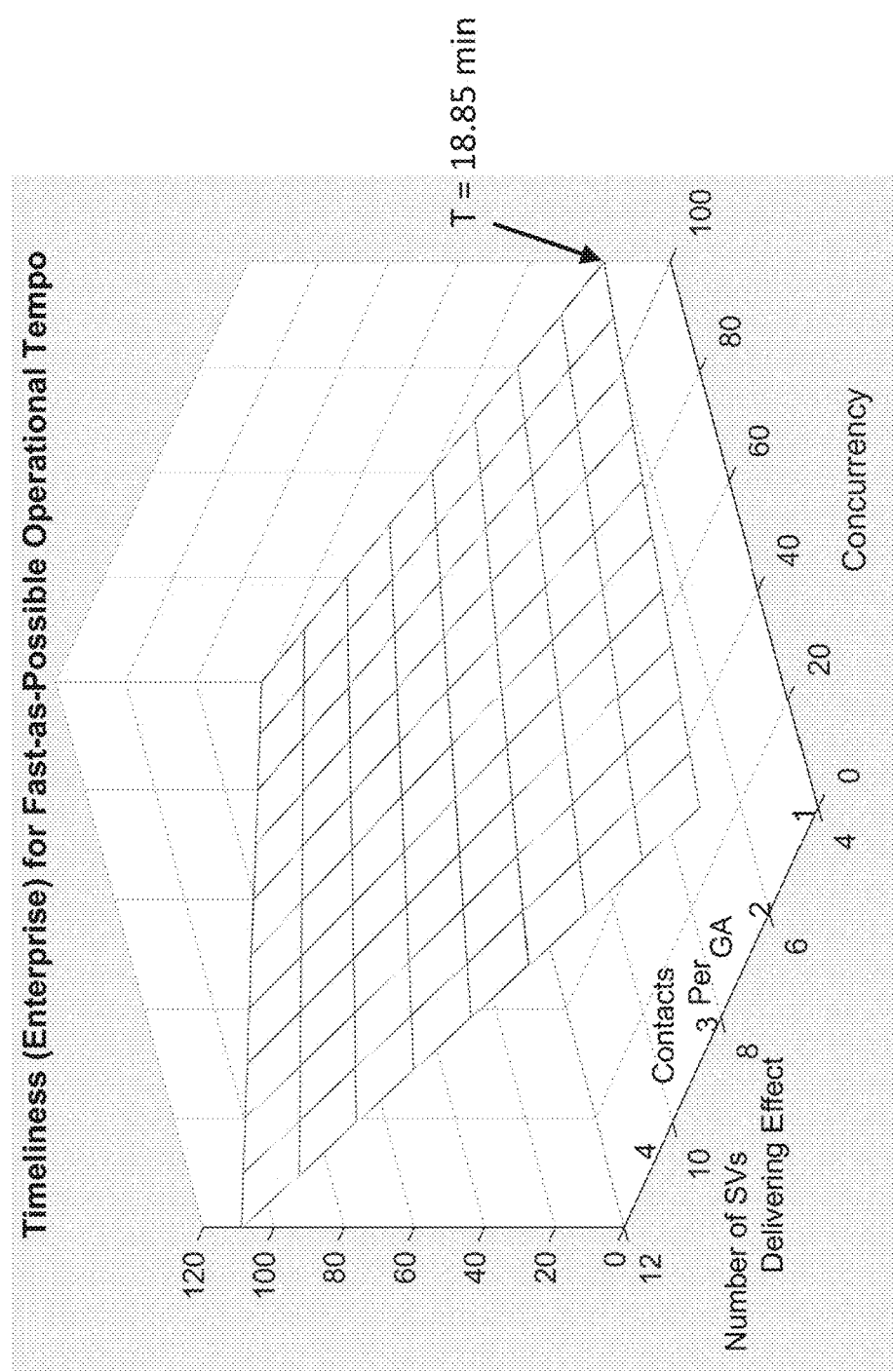
FIG. 4 is a graph of timeliness to deliver a satellite effect according to various examples described herein.

An example of using operational relationships and variables is provided. FIG. 4 is a three-dimensional graph 35 showing timeliness to deliver a satellite effect represented as a function of several independent variables. A mission need for rapid effects delivery in this example prioritizes achieving the lowest value of timeliness T. Embodiments provided herein solve the inverse problem for the best commanding.

In a first step, the variables are operational and architectural variables that are primary contributors to Timeliness: contacts=number of contacts per ground antenna, NumberSV=Number of SVs delivering effect, and Concurrency=the amount of overlap in time between the uploading of the effect and the delivery of the effect to the user. The functional relationship can be expressed as follows: T=f (contacts, NumberSV, Concurrency), which can be separated as follows: T=T$_1$(contacts) T$_2$(NumberSV) T$_3$(Concurrency).

In a second step and a third step, the second step is mathematically instantiated as an ArgMin or "arg min" operation and the third step is mathematically instantiated as the range over which the ArgMin is performed (notationally appearing below the arg min operation):

$$\underset{contacts \in [1,\ 5]}{\operatorname{argmin} T_1} = 1$$

$$\underset{NumberSV \in [4\ \ 12]}{\operatorname{argmin} T_2} = 5$$

$$\underset{concurrency \in [0,\ 100]}{\operatorname{argmin} T_3} = 100$$

Instead of using an ArgMin operation as provided by example above, an ArgMax operation may also be used in certain embodiments. In optimization of a separated component, to optimally solve that component, it is a determination of an extremum, either a max or a min, depending on the mission context. Accordingly, certain contexts are more suited to using an ArgMax as the extremum, such as needing to overcome jamming by maximizing power delivered to a user, and other contexts or applications are more suited to the extremum being ArgMin, such as a user needing the effect to be received as soon as possible by minimizing the time it takes to deliver the effect. As a point of clarification, it is understood that the terms "ArgMin," "Arg min," "argmin" and the like are meant to be equivalent to one another and also that "ArgMax," "Arg max," "argmax" and the like are meant to be equivalent to one another.

In a fourth step, the procedures of the first three steps inverted Timeliness, as such the following is inverted: T=f(#contacts per GA, #SV's, Concurrency), which provides (#contacts per GA, #SV's, Concurrency)=f$^{-1}$T, and a solution of f$^{-1}$ (18.85)=(1, 4, 100). The triple (solution) is the optimal commanding and architecture. The relationships in this example have been linear, therefore, there are not extra solutions which need to be removed by filtering and the fourth step is done "for free."

In another example, a variable included in the Timeliness is a time needed to start up a traveling wave tube (TWT) in one or more satellites.

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 5:
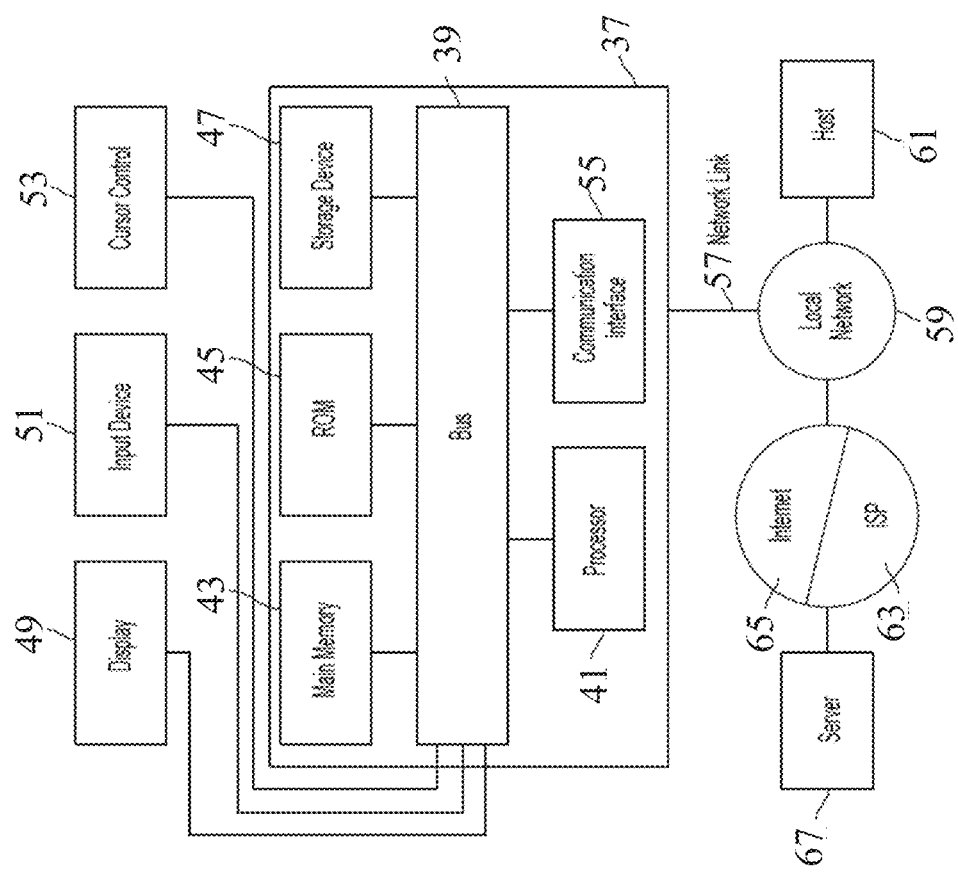
FIG. 5 is a functional block diagram of an example of a computing system that may be configured to implement various examples of the processes described herein.

As an example of a system for implementing the method 15, FIG. 5 is a block diagram of a computer system 37. Computer system 37 includes a bus 39 or other communication mechanism for communicating information, and a hardware processor 41 coupled with the bus 39 for processing information. Hardware processor 41 may be a general-purpose microprocessor.

Computer system 37 also includes a main memory 43, such as a random access memory (RAM) or other dynamic storage device, coupled to bus 39 for storing information and instructions to be executed by processor 41. Main memory 43 also may be used for storing temporary variables or other intermediate information during execution of instructions to be executed by processor 41. Such instructions, when stored in one or more non-transitory storage media accessible to processor 41, render computer system 37 into a special-purpose machine that is customized to perform the operations specified in the instructions.

Computer system 37 further includes a read only memory (ROM) 45 or other static storage device coupled to bus 39 for storing static information and instructions for processor 41. A storage device 47, such as a magnetic disk or optical disk, is provided and coupled to bus 39 for storing information and instructions.

Computer system 37 may be coupled via bus 39 to a display 49, such as a liquid crystal display (LCD), plasma display, electronic ink display, cathode ray tube (CRT) monitor, or any other kind of device for displaying information to a computer user. An input device 51, including alphanumeric and other keys, may be coupled to bus 39 for communicating information and command selections to processor 41. Alternatively or additionally, computer system 37 may receive user input via a cursor control 53, such as a mouse, a trackball, a trackpad, or cursor direction keys for communicating direction information and command selections to processor 41 and for controlling cursor movement on display 49. This input device typically has two degrees of freedom in two axes, a first axis (e.g., x) and a second axis (e.g., y), that allows the device to specify positions in a plane. Alternatively or additionally, computer system 37 may include a touchscreen. Display 49 may be configured to receive user input via one or more pressure-sensitive sensors, multi-touch sensors, and/or gesture sensors. Alternatively or additionally, computer system 37 may receive user input via a microphone, video camera, and/or some other kind of user input device (not shown).

Computer system 37 may implement the techniques described herein using customized hard-wired logic, one or more ASICs or FPGAs, firmware, and/or program logic which in combination with other components of computer system 37 causes or programs computer system 37 to be a special-purpose machine. According to one embodiment, the techniques herein are performed by computer system 37 in response to processor 41 executing one or more sequences of one or more instructions contained in main memory 43. Such instructions may be read into main memory 43 from another storage medium, such as storage device 47. Execution of the sequences of instructions contained in main memory 43 causes processor 41 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 47. Volatile media includes dynamic memory, such as main memory 43. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 39. Transmission media may also take the form of acoustic or light waves, such as those generated during radio-wave and infra-red data communications.

Various forms of media may be involved in carrying one or more sequences of one or more instructions to processor 41 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 37 may receive the data from the network and place the data on bus 39. Bus 39 carries the data to main memory 43, from which processor 41 retrieves and executes the instructions. The instructions received by main memory 43 may optionally be stored on storage device 47 either before or after execution by processor 41.

Computer system 37 also includes a communication interface 55 coupled to bus 39. Communication interface 55 provides a two-way data communication coupling to a network link 57 that is connected to a local network 59. For example, communication interface 55 may be an integrated services digital network (ISDN) card, cable modem, satellite modem, or a modem to provide a data communication connection to a corresponding type of telephone line. As another example, communication interface 55 may be a local area network (LAN) card to provide a data communication connection to a compatible LAN. Wireless links may also be implemented. In any such implementation, communication interface 55 sends and receives electrical, electromagnetic or optical signals that carry digital data streams representing various types of information.

Network link 57 typically provides data communication through one or more networks to other data devices. For example, network link 57 may provide a connection through local network 59 to a host computer 61 or to data equipment operated by an Internet Service Provider (ISP) 63. ISP 63 in turn provides data communication services through the worldwide packet data communication network now commonly referred to as the "Internet" 65. Local network 59 and Internet 65 both use electrical, electromagnetic or optical signals that carry digital data streams. The signals through the various networks and the signals on network link 57 and through communication interface 55, which carry the digital data to and from computer system 37, are example forms of transmission media.

Computer system 37 can send messages and receive data, including program code, through the network(s), network link 57 and communication interface 55. In the Internet example, a server 67 might transmit a requested code for an application program through Internet 65, ISP 63, local network 59, and communication interface 55.

The received code may be executed by processor 41 as it is received, and/or stored in storage device 47, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

It is to be appreciated that embodiments of the computer readable mediums, systems, methods, and apparatuses discussed herein are not limited in application to the details of construction and the arrangement of components set forth in the following description or illustrated in the accompanying drawings. The embodiments are capable of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. A communications apparatus for optimal delivery of one or more satellite effects via reverse time heat equation isomorphism comprising:
   one or more processors configured to perform a plurality of steps including:
   constructing a generalized formulation of the heat equation including a plurality of variables;
   performing a separation of variables to decouple the plurality of variables into a plurality of corresponding separated equations;
   solving the plurality of separated equations to produce candidate solutions;
   applying boundary conditions to each candidate solution to verify the candidate solution satisfies the boundary conditions;
   filtering the candidate solutions to mitigate ill-posedness of solving an inverse of the heat equation;
   assessing formal differences between the candidate solutions and the inverse of the heat equation to find an optimal solution corresponding to the solution of the inverse of the generalized heat equation;
   generating an optimized schedule of the one or more satellite effects based on the assessment of the formal differences of the candidate solutions; and
   causing the optimized schedule of the one or more satellite effects to be implemented by one or more space vehicles.

2. The communication apparatus of claim 1 wherein the one or more processors are further configured to determine that each step of the plurality of steps is isomorphic to running a generalized heat equation backwards in time.

3. The communications apparatus of claim 1 further comprising assessing formal differences between the plurality of corresponding separated equations and the inverse of the heat equation by:
   determining a first number of functions N of a single variable in a product decomposition of the inverse heat equation;
   determining a second number of functions M of a single variable in a product decomposition of the plurality of variables; and
   determining a quantity of N-M.

4. The communications apparatus of claim 3 wherein assessing formal differences between the plurality of corresponding separated equations and the inverse of the heat equation further comprises:
   determining the quantity of N-M is non-zero; and
   responsive to determining the quantity of N-M is non-zero, implementing a change of variables, an orthogonalization technique, or a representation change by a Kolmogorov-Arnold Representation Theorem.

5. The communications apparatus of claim 1 wherein assessing formal differences between the candidate solutions and the inverse of the heat equation comprises:
determining the plurality of solved equations includes component terms that are relations, functionals, or distributions.

6. The communications apparatus of claim 5 wherein assessing formal differences between the candidate solutions and the inverse of the heat equation further comprises:
responsive to determining that the plurality of solved equations includes component terms that are relations, functionals, or distributions, implementing a smoothing algorithm, a machine learning algorithm, or an artificial intelligence algorithm to solve the plurality of separated equations.

7. The communications apparatus of claim 5 wherein assessing formal differences between the candidate solutions and the inverse of the heat equation further comprises:
obtaining a solution of said component terms using iterative optimization, a reservoir computer, a machine learning algorithm, an artificial intelligence algorithm, or a combination thereof to perform an ArgMin operation or an ArgMax operation to solve the plurality of separated equations.

8. The communications apparatus of claim 1 wherein solving the plurality of separated equations comprises:
applying an ArgMin operation or ArgMax operation to the plurality of separated equations by analysis, machine learning, or artificial intelligence.

9. The communications apparatus of claim 8 wherein applying boundary conditions to each candidate solution comprises:
applying the boundary conditions as a range over which the ArgMin operation or the ArgMax operation is applied.

10. The communications apparatus of claim 1 wherein assessing formal differences between the candidate solutions and the inverse of the heat equation comprises:
determining a figure of merit of the boundary conditions; and
comparing the figure of merit to a predetermined figure of merit.

11. The communications apparatus of claim 10 wherein the predetermined figure of merit includes a timeliness T at time t=0.

12. The communication apparatus of claim 10 wherein the predetermined figure of merit includes a number of space vehicles participating in a positioning effect being below a predetermined number of space vehicles.

13. The communications apparatus of claim 1 wherein assessing formal differences between the candidate solutions and the inverse of the heat equation comprises:
comparing an elimination of outlier solutions that are unstable among the solution for each equation of the plurality of solved equations to a smoothing operation applied to a solution of the inverse heat equation.

14. The communications apparatus of claim 13 wherein an unstable outlier solution has a high derivative.

15. The communications apparatus of claim 1 wherein the plurality of variables includes one or more operational variables and/or one or more architectural variables.

16. The communications apparatus of claim 15 wherein the one or more architectural variables includes a total number of the one or more satellites, a number of ground antennas, one or more satellite orbits, or a data rate of one or more satellite antennas.

17. The communications apparatus of claim 1 wherein generating the optimized schedule comprises generating the optimized schedule in a format that is implemented by one or more satellites to fulfil a commander's intent.

18. The communications apparatus of claim 1 wherein the plurality of variables include one or more of a number of contacts per ground antenna, a number of space vehicles delivering the one or more satellite effects, a concurrency as an amount of overlap in time between uploading the one or more satellite effects and the delivery of the one or more satellite effects to a user.

19. A method of operating a communications apparatus for optimal delivery of one or more satellite effects via reverse time heat equation isomorphism, the method including a plurality of steps comprising:
constructing a generalized formulation of the heat equation including a plurality of variables;
performing a separation of variables to decouple the plurality of variables into a plurality of corresponding separated equations;
solving the plurality of separated equations to produce candidate solutions;
applying boundary conditions to each candidate solution to verify the candidate solution satisfies the boundary conditions;
filtering the candidate solutions to mitigate ill-posedness of solving an inverse of the heat equation;
assessing formal differences between the candidate solutions and the inverse of the heat equation to find an optimal solution corresponding to the solution of the inverse of the generalized heat equation;
generating an optimized schedule of the one or more satellite effects based on the assessment of the formal differences of the candidate solutions; and
causing the optimized schedule of the one or more satellite effects to be implemented by one or more space vehicles.

20. A non-transitory computer-readable medium storing instructions, the instructions executed by one or more processors of a communications apparatus for optimal delivery of one or more satellite effects via reverse time heat equation isomorphism, the instructions causing the one or more processors to implement a plurality of steps comprising:
constructing a generalized formulation of the heat equation including a plurality of variables;
performing a separation of variables to decouple the plurality of variables into a plurality of corresponding separated equations;
solving the plurality of separated equations to produce candidate solutions;
applying boundary conditions to each candidate solution to verify the candidate solution satisfies the boundary conditions;
filtering the candidate solutions to mitigate ill-posedness of solving an inverse of the heat equation;
assessing formal differences between the candidate solutions and the inverse of the heat equation to find an optimal solution corresponding to the solution of the inverse of the generalized heat equation;
generating an optimized schedule of the one or more satellite effects based on the assessment of the formal differences of the candidate solutions; and causing the optimized schedule of the one or more satellite effects to be implemented by one or more space vehicles.

\* \* \* \* \*